(12) United States Patent
Wang et al.

(10) Patent No.: US 12,379,800 B2
(45) Date of Patent: Aug. 5, 2025

(54) DISPLAY SUBSTRATE, DISPLAY PANEL AND DISPLAY APPARATUS

(71) Applicants: Beijing BOE Display Technology Co., Ltd., Beijing (CN); BOE Technology Group Co., Ltd., Beijing (CN)

(72) Inventors: Tingting Wang, Beijing (CN); Xu Wang, Beijing (CN); Qi Wang, Beijing (CN); Yan Yan, Beijing (CN); Tao Gong, Beijing (CN); Hui Guo, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/284,903

(22) PCT Filed: Feb. 21, 2023

(86) PCT No.: PCT/CN2023/077312
§ 371 (c)(1),
(2) Date: Sep. 29, 2023

(87) PCT Pub. No.: WO2024/174078
PCT Pub. Date: Aug. 29, 2024

(65) Prior Publication Data
US 2025/0077007 A1    Mar. 6, 2025

(51) Int. Cl.
*G06F 3/041*    (2006.01)
*G06F 3/044*    (2006.01)

(52) U.S. Cl.
CPC .......... *G06F 3/0412* (2013.01); *G06F 3/0443* (2019.05); *G06F 3/0446* (2019.05)

(58) Field of Classification Search
None
See application file for complete search history.

(56) References Cited

U.S. PATENT DOCUMENTS 11,106,072 B2 *   8/2021  Yoshida ............... G06F 3/0412
2017/0115784 A1 * 4/2017  Li ....................... G02F 1/13338
(Continued)

FOREIGN PATENT DOCUMENTS

CN    101377593 A     3/2009
CN    102279493 A    12/2011
(Continued)

*Primary Examiner* — Duane N Taylor, Jr.
(74) *Attorney, Agent, or Firm* — HOUTTEMAN LAW LLC

(57) ABSTRACT

A display substrate, including: a substrate; and a plurality of data lines each extending in a first direction, a touch layer, and a plurality of touch signal lines, sequentially arranged away from the substrate, wherein the touch layer includes a plurality of touch electrodes configured to be multiplexed as common electrodes, and each touch electrode includes a plurality of touch sub-electrodes electrically connected to each other; wherein the touch sub-electrodes are arranged in an array along the first direction and a second direction, a first slit is between any two adjacent touch sub-electrodes along the second direction, and orthographic projections of the first slit and a corresponding data line on the substrate overlap each other; the touch signal lines are connected to the touch electrodes, and an orthographic projection of at least one touch signal line on the substrate covers the orthographic projection of the first slit on the substrate.

20 Claims, 10 Drawing Sheets

(56) References Cited

U.S. PATENT DOCUMENTS

| | | | |
|---|---|---|---|
| 2017/0153731 A1* | 6/2017 | Liu | G06F 3/0443 |
| 2019/0285954 A1* | 9/2019 | Yoshida | G06F 3/04164 |
| 2024/0105735 A1* | 3/2024 | Yoshino | G06F 3/0443 |

FOREIGN PATENT DOCUMENTS

| | | | | |
|---|---|---|---|---|
| CN | 104597670 A | | 5/2015 | |
| CN | 104657024 A | | 5/2015 | |
| CN | 104777933 A | | 7/2015 | |
| CN | 104808375 A | | 7/2015 | |
| CN | 105652543 A | | 6/2016 | |
| CN | 106354347 A | * | 1/2017 | ......... G02F 1/13338 |
| CN | 206696569 U | * | 12/2017 | |
| CN | 207148492 U | | 3/2018 | |
| CN | 108469927 A | * | 8/2018 | ......... G02F 1/13306 |
| CN | 108628047 A | | 10/2018 | |
| CN | 109725761 A | * | 5/2019 | ......... G02F 1/13338 |
| CN | 113189820 A | * | 7/2021 | |
| CN | 114077077 A | | 2/2022 | |
| CN | 110045852 B | | 7/2022 | |
| JP | 2007027601 A | | 2/2007 | |
| KR | 20110079272 A | | 7/2011 | |

\* cited by examiner

DISPLAY SUBSTRATE, DISPLAY PANEL AND DISPLAY APPARATUS

TECHNICAL FIELD

The present disclosure relates to the field of display technology, and particularly relates to a display substrate, a display panel, and a display apparatus.

BACKGROUND

The liquid crystal display panel includes a display substrate and an assembling substrate opposite to each other, and a liquid crystal layer between the two. The liquid crystal layer is deflected by an electric field formed between pixel electrodes and common electrodes so that light can be transmitted. In some products, a touch structure may be further integrated in the liquid crystal display panel, so that the display panel can implement both a touch function and a display function.

SUMMARY

The present disclosure provides a display substrate, a display panel, and a display apparatus.

The present disclosure provides a display substrate, including:

- a substrate;
- a plurality of data lines on the substrate and each extending in a first direction;
- a touch layer on a side of a layer where the data lines are located away from the substrate, wherein the touch layer includes a plurality of touch electrodes which are configured to be multiplexed as common electrodes, and each touch electrode includes a plurality of touch sub-electrodes electrically connected to each other; wherein the touch sub-electrodes are arranged in an array along the first direction and a second direction, a first slit is provided between any two adjacent ones of the touch sub-electrodes along the second direction, and an orthographic projection of the first slit on the substrate is overlapped with an orthographic projection of a corresponding data line on the substrate; and the first direction is intersected with the second direction; and
- a plurality of touch signal lines on a side of the touch layer away from the substrate and connected to the touch electrodes, wherein an orthographic projection of at least one touch signal line on the substrate covers the orthographic projection of the first slit on the substrate.

In some embodiments, the orthographic projection of the at least one touch signal line on the substrate is overlapped with orthographic projections of the touch sub-electrodes on two sides of the first slit.

In some embodiments, the orthographic projection of the touch signal line on the substrate is overlapped with the orthographic projections of the touch sub-electrodes on two sides of the first slit on the substrate by a first width in the second direction, wherein the first width is 1 to 1.2 times of a preset width D, $$D=\sqrt{D1^2+D2^2+D3^2}$$

where D1 is a maximum displacement fluctuation value in a manufacturing process of the touch signal lines; D2 is a maximum single-side size fluctuation value in the manufacturing process of the touch signal line; and D3 is a maximum single-side size fluctuation value in the manufacturing process of the touch sub-electrodes.

In some embodiments, the first width is equal to D.

In some embodiments, the first width is between 1.69 μm and 2.0 μm.

In some embodiments, an orthographic projection of each touch signal line on the substrate covers the orthographic projection of the first slit on the substrate, and is overlapped with the orthographic projections of the touch sub-electrodes on two sides of the first slit on the substrate.

In some embodiments, the display substrate has a display area in which the touch layer and at least part of the data lines are located, the display area is further provided with a plurality of gate lines which, with the plurality of data lines, divide the display area into a plurality of pixel areas, wherein each pixel area is provided with a pixel electrode on a side of the touch layer away from the substrate and having a second slit.

In some embodiments, a first passivation layer is disposed between the touch layer and the touch signal lines, a second passivation layer is disposed on a side of a layer where the touch signal lines are located away from the substrate, and the pixel electrode is disposed on a side of the second passivation layer away from the substrate.

In some embodiments, the display substrate further has a peripheral area surrounding the display area, and the display substrate further includes, in the peripheral area:

- a first signal transmission electrode in the same layer as the gate lines;
- a second signal transmission electrode in the same layer as the data lines; and
- a connecting electrode in the same layer as the pixel electrode, wherein the connecting electrode is connected to the first signal transmission electrode through a first via, and connected to the second signal transmission electrode through a second via.

In some embodiments, a passivation layer is disposed on a side of the touch layer away from the substrate, and the touch signal lines and the pixel electrode are both located on a side of the passivation layer away from the substrate; and a protective layer is further disposed on a side of the touch signal lines away from the substrate, wherein the protective layer covers the touch signal lines and is disposed in the same layer as the pixel electrode.

In some embodiments, an orthographic projection of the protective layer on the substrate exceeds the orthographic projection of the touch signal line on the substrate by a width being 1 to 1.2 times of a second preset width D', $$D'=\sqrt{D1^2+D2^2+D4^2+D5^2}$$

where D1 is a maximum displacement fluctuation value in a manufacturing process of the touch signal lines; D2 is a maximum single-side size fluctuation value in the manufacturing process of the touch signal line; D4 is a maximum displacement fluctuation value in a manufacturing process of the protective layer; and D5 is a maximum single-side size fluctuation value in the manufacturing process of the protective layer.

In some embodiments, the display substrate further has a peripheral area surrounding the display area, and the display substrate further includes, in the peripheral area:

- a first signal transmission electrode in the same layer as the gate lines;
- a second signal transmission electrode in the same layer as the data lines; and
- a first connecting electrode and a second connecting electrode arranged in a stack and connected to each other, wherein the first connecting electrode is disposed in the same layer as the touch signal lines, the first connecting electrode is connected to the first signal transmission electrode through a first via, and connected to the second signal transmission electrode through a second via; and the second connecting electrode is disposed on a side of the first connecting electrode away from the substrate, and is disposed in the same layer as the pixel electrode.

In some embodiments, orthographic projections of the first connecting electrode and the second connecting electrode on the substrate are coincided.

In some embodiments, the display substrate further includes: a plurality of common electrode lines between the touch layer and the substrate and electrically connected to the touch electrodes.

In some embodiments, each touch signal line includes: a plurality of first line segments arranged in a first direction, and a second line segment connected between any two adjacent first line segments, wherein an orthographic projection of each first line segment on the substrate is overlapped with the orthographic projection of the first slit on the substrate, and an orthographic projection of at least part of the second line segment on the substrate is not overlapped with the orthographic projection of the first slit on the substrate; and
each touch electrode is connected to the second line segment of the corresponding touch signal line.

In some embodiments, each touch electrode is connected to a plurality of second line segments of the corresponding touch signal line.

In some embodiments, within a same touch electrode, one of the touch sub-electrodes in each row is connected to the touch signal line; and any two adjacent touch sub-electrodes in a same row are connected through a connecting part which forms an integral structure with the touch sub-electrodes.

In some embodiments, the display substrate further includes a plurality of gate lines, and an orthographic projection of the second line segment on the substrate is overlapped with an orthographic projection of the corresponding gate line on the substrate.

In a second aspect, the present disclosure provides a display panel, including the display substrate as described above and a color filter substrate opposite to each other.

In a third aspect, the present disclosure provides a display apparatus, including the display panel as described above.

BRIEF DESCRIPTION OF DRAWINGS

Accompanying drawings are provided for further understanding of the present disclosure and constitute a part of the specification. Hereinafter, these drawings are intended to explain the present disclosure together with the following specific implementations, but should not be considered as a limitation of the present disclosure, in which.

DETAIL DESCRIPTION OF EMBODIMENTS

Figure 1:
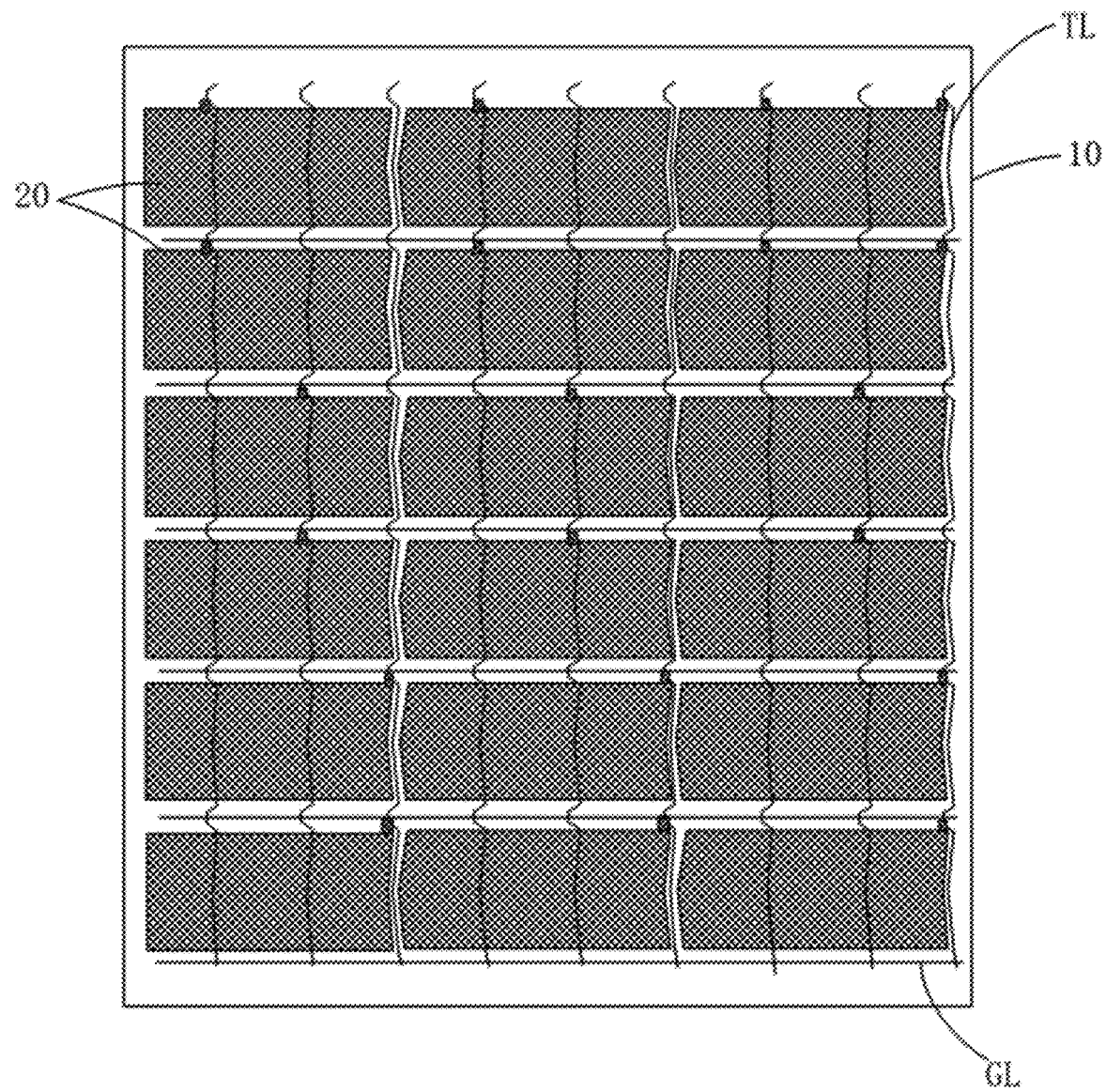
FIG. 1 is a schematic diagram of a display substrate according to some embodiments.

To make the objects, technical solutions and advantages of the embodiments of the present disclosure more apparent, the technical solutions according to the embodiments of the present disclosure will be clearly and completely described below with reference to the drawings of the embodiments of the present disclosure. Apparently, the described exemplary embodiments are some, but not all, of the embodiments of the present disclosure. All other embodiments obtained by those of ordinary skill in the art based on the embodiments of the present disclosure described herein without paying any creative effort shall be included in the protection scope of the present disclosure.

Unless otherwise defined, technical or scientific terms used in the present disclosure are intended to have general meanings as understood by those of ordinary skill in the art. The words "first", "second" and similar terms used in the present disclosure do not denote any order, quantity, or importance, but are used merely for distinguishing different components from each other. Also, the use of the terms "a", "an" or "the" and similar referents do not denote a limitation of quantity, but rather denote the presence of at least one. The word "comprising" or "including" or the like means that the element or item preceding the word contains elements or items that appear after the word or equivalents thereof, but does not exclude other elements or items. The terms "connected" or "coupled" and the like are not restricted to physical or mechanical connections, but may include electrical connections, whether direct or indirect. The words "upper", "lower", "left", "right", and the like are merely used to indicate a relative positional relationship, and when an absolute position of the described object is changed, the relative positional relationship may be changed accordingly.

It should be noted that in the drawings, sizes of the layers and areas may be exaggerated for clarity of illustration. Moreover, it will be understood that when an element or layer is referred to as being "on" another element or layer, it may be directly on the another element or layer, or intervening layers may be present therebetween. In addition, it will be understood that when an element or layer is referred to as being "under" another element or layer, it may be directly under the other element, or more than one intervening layer or element may be present therebetween. In addition, it will be further understood that when a layer or element is referred to as being "between" two layers or elements, it may be the only layer between the two layers or elements, or more than one other intervening layer or element may be present between the two layers or elements.

It should be further noted that when referring to "disposed in the same layer" in the embodiments of the present disclosure, it means that two structures are formed by the same material layer through a patterning process, and therefore, the two structures are located in the same layer in terms of the stack-up relationship; but it does not necessarily mean that the distance between the two and the substrate are the same.

Figure 2:
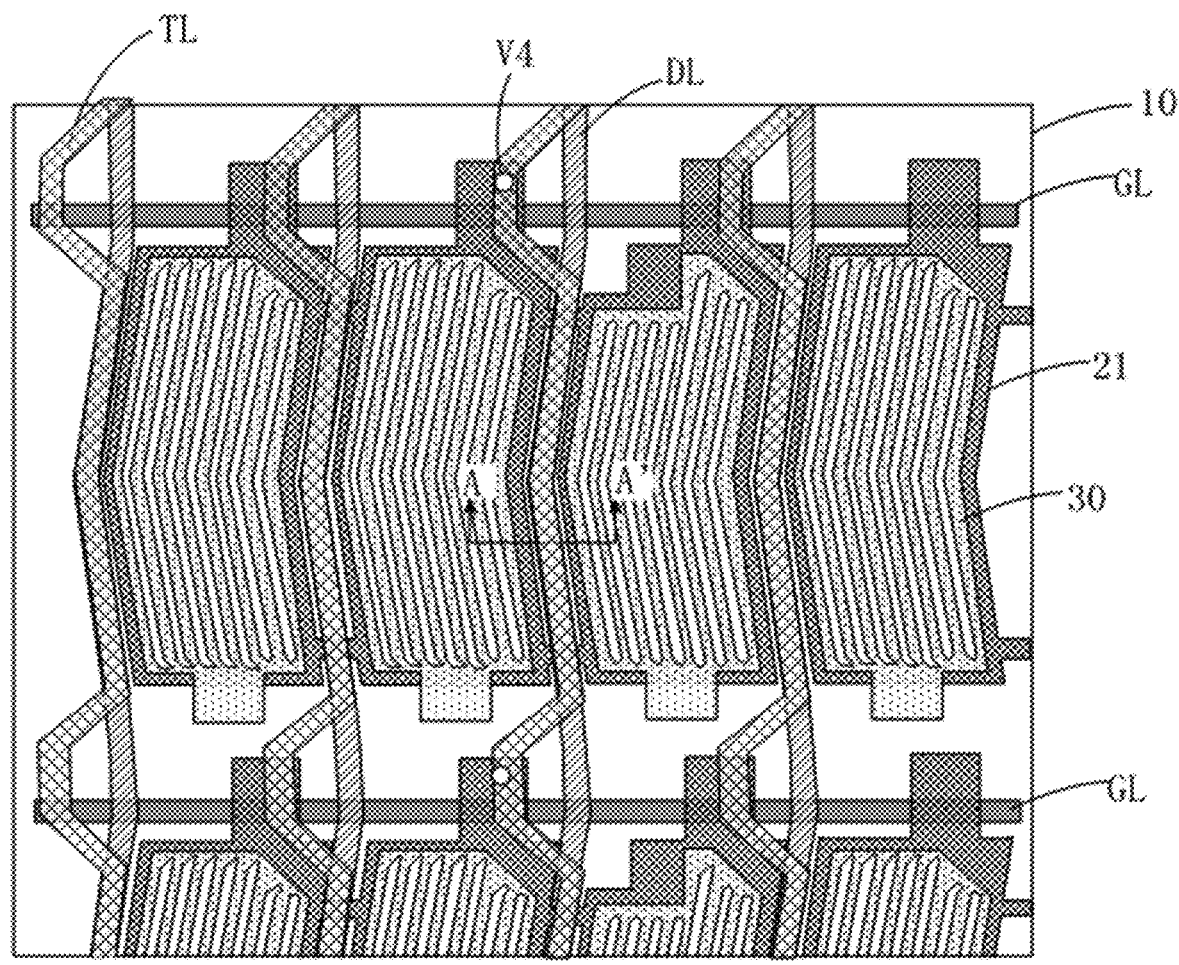
FIG. 2 is a plan view of touch electrodes, pixel electrodes, touch signal lines and data lines in a local area of the display substrate shown in FIG. 1.
Figure 3:
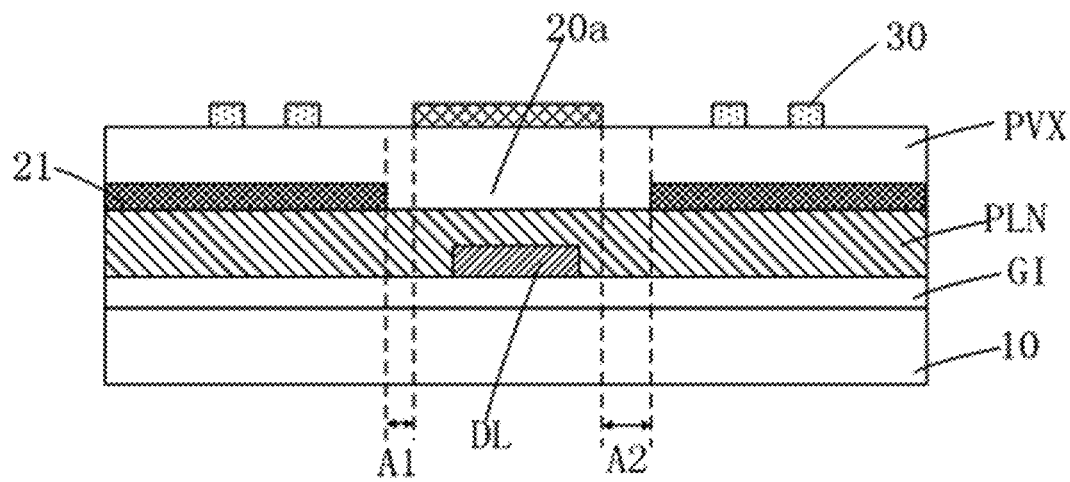
FIG. 3 is a sectional view taken along line A-A' in FIG. 2.

The liquid crystal display panel includes a display substrate and an assembling substrate opposite to each other, and a liquid crystal layer between the two. FIG. 1 is a schematic diagram of a display substrate according to some embodiments, FIG. 2 is a plan view of touch electrodes, pixel electrodes, touch signal lines and data lines in a local area of the display substrate shown in FIG. 1, and FIG. 3 is a sectional view taken along line A-A' in FIG. 2. As shown in FIGS. 1 to 3, the display substrate includes a plurality of gate lines GL and a plurality of data lines DL (not shown) on a substrate 10. The plurality of gate lines GL and the plurality of data lines DL are intersected with each other to define a plurality of pixel area (PA) each provided with a pixel electrode 30. In addition, the display substrate may further include common electrodes. When the liquid crystal display panel is used for display, common electrode lines (not shown) provide a common voltage for the common electrodes, and the data lines DL provide a pixel voltage for the pixel electrodes 30, so that an electric field is generated between the common electrodes and the pixel electrodes 30 to drive the liquid crystal to deflect.

In addition, a touch structure may be further integrated in the liquid crystal display panel, so that touch control can be implemented and the integration level of the product can be improved. As shown in FIG. 1, the display substrate further includes touch signal lines TL. The common electrodes may be multiplexed as touch electrodes 20, and each touch electrode 20 is connected to one of the touch signal lines TL. In this case, the liquid crystal display panel implements touch control and display in a time-sharing manner. In a display stage, the common electrode lines provide a common voltage signal for the common electrodes; and in the touch control stage, the touch signal lines TL provide a touch driving signal for the common electrodes (i.e., the touch electrodes 20).

As shown in FIGS. 2 and 3, an orthographic projection of each touch signal line TL on the substrate 10 is overlapped with an orthographic projection of the corresponding data line DL on the substrate 10. An orthographic projection of each touch electrode 20 on the substrate 10 is overlapped with a plurality of pixel areas PA. For example, each touch electrode 20 includes a plurality of touch sub-electrodes 21 arranged in an array, and an orthographic projection of each touch sub-electrode 21 on the substrate 10 is overlapped with an orthographic projection of one pixel electrode 30 on the substrate 10. Within a same touch electrode 20, two adjacent touch sub-electrodes 21 in a same row are connected through a connecting part, and each row of touch sub-electrodes 21 are connected to a touch signal line TL corresponding to the touch electrode 20 to which the touch sub-electrodes belong through a fourth via V4.

As shown in FIG. 3, across the display substrate, a first slit 20a is provided between two adjacent touch sub-electrodes 21 in the same row (for example, a slit between two adjacent touch sub-electrodes 21 in a same row within the same touch electrode 20, or a slit between two adjacent touch electrodes 20 in a same row). The orthographic projections of both the touch signal line TL and the data line DL on the substrate 10 are overlapped with an orthographic projection of the first slit 20a on the substrate 10. In some embodiments, the touch signal line TL has a width smaller than the first slit 20a. However, since voltages on the data line DL and the pixel electrode 30 are the same, a lateral electric field is generated between the data line DL and the touch sub-electrode 21 in the structure shown in FIGS. 2 and 3, so that the liquid crystal deflection in the pixel area PA near the data line DL (e.g., areas A1 and A2 in FIG. 3) is disturbed, and pixel light leakage is thus generated.

Figure 4:
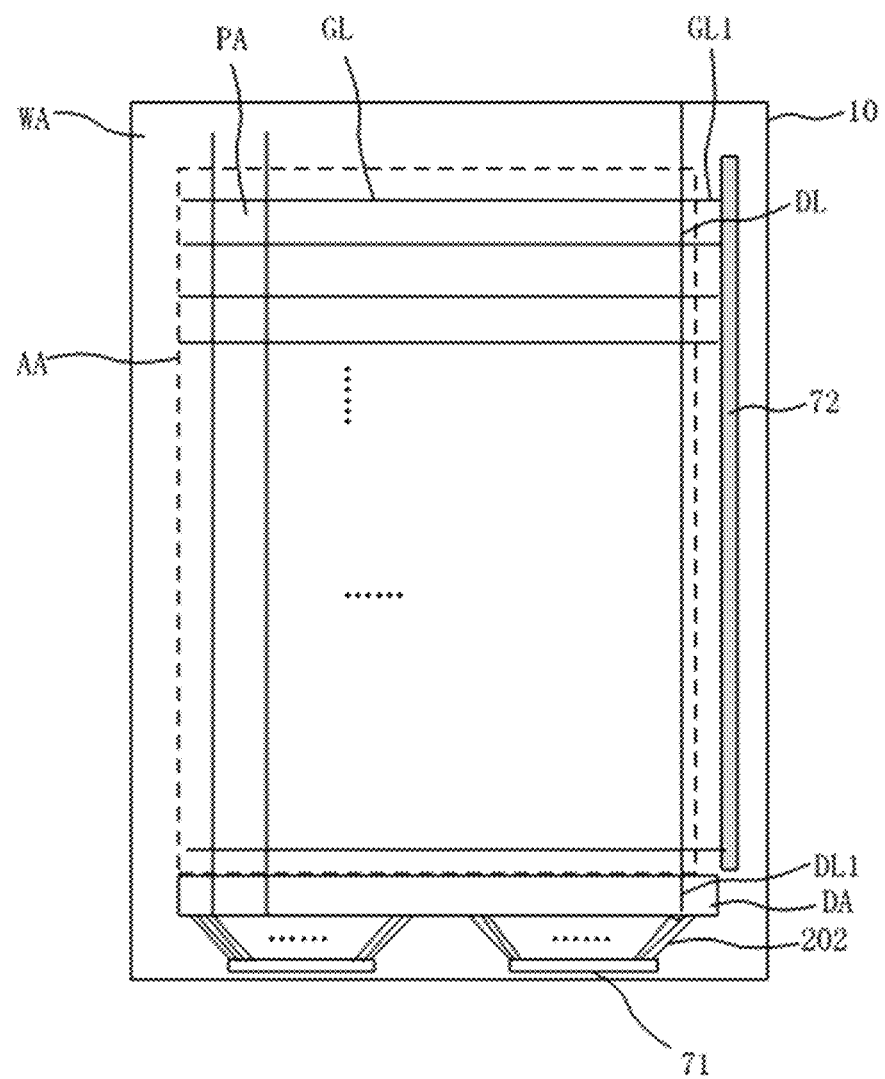
FIG. 4 is a schematic diagram showing area division of a display substrate according to some embodiments of the present disclosure.
Figure 5:
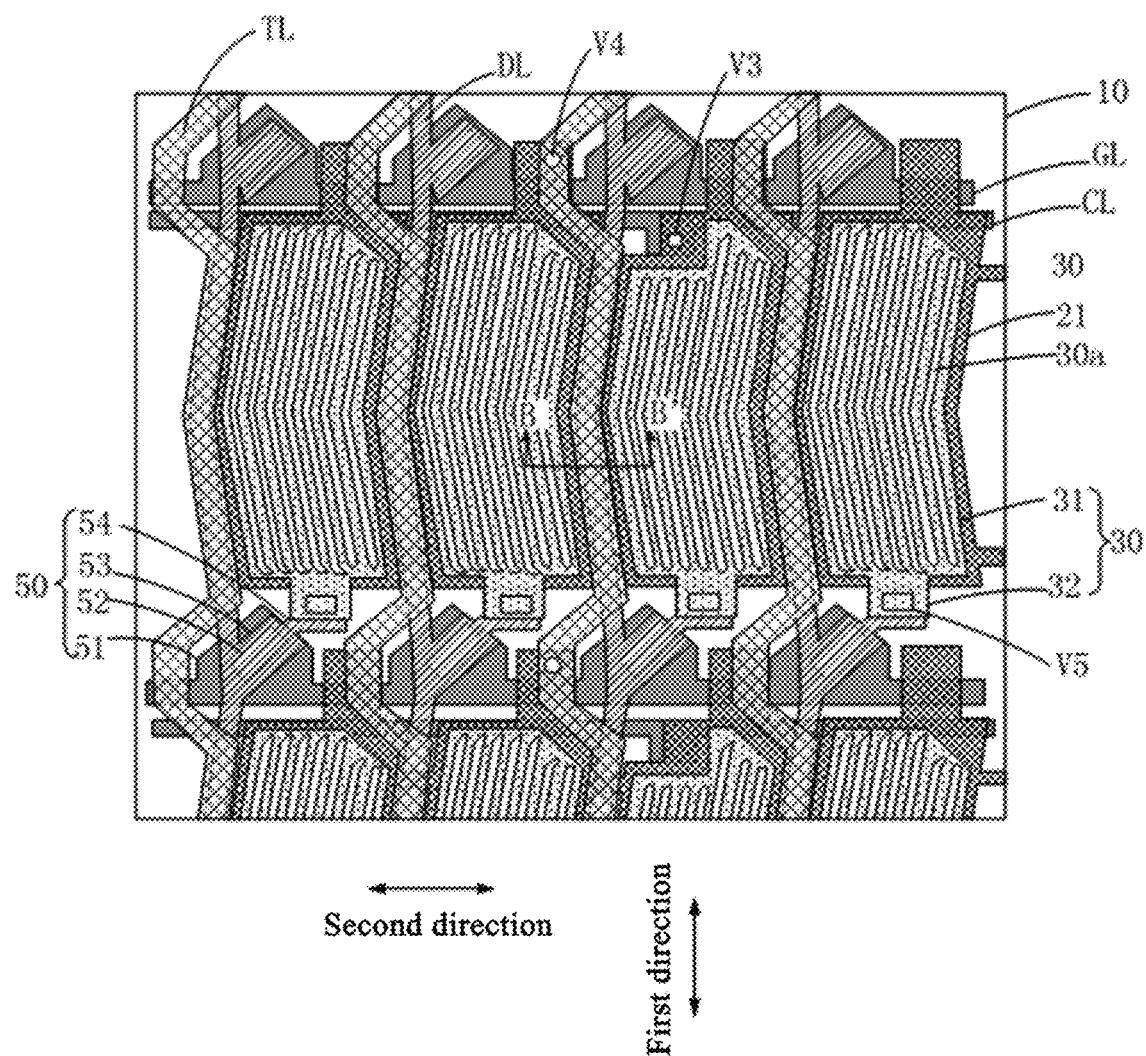
FIG. 5 is a partial schematic diagram of a display substrate according to some embodiments of the present disclosure.
Figure 6:
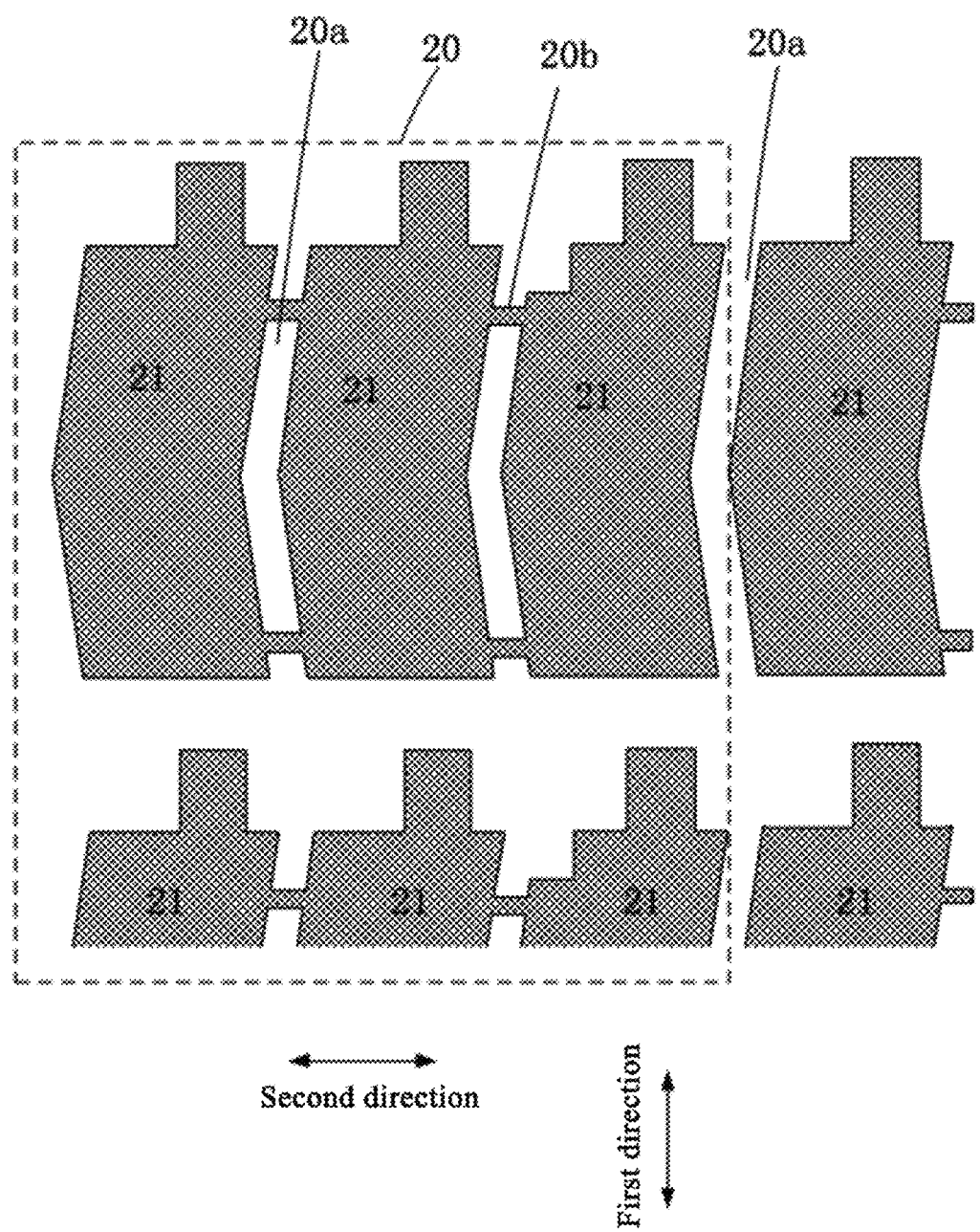
FIG. 6 is a schematic diagram of the touch electrodes in FIG. 5.
Figure 7:
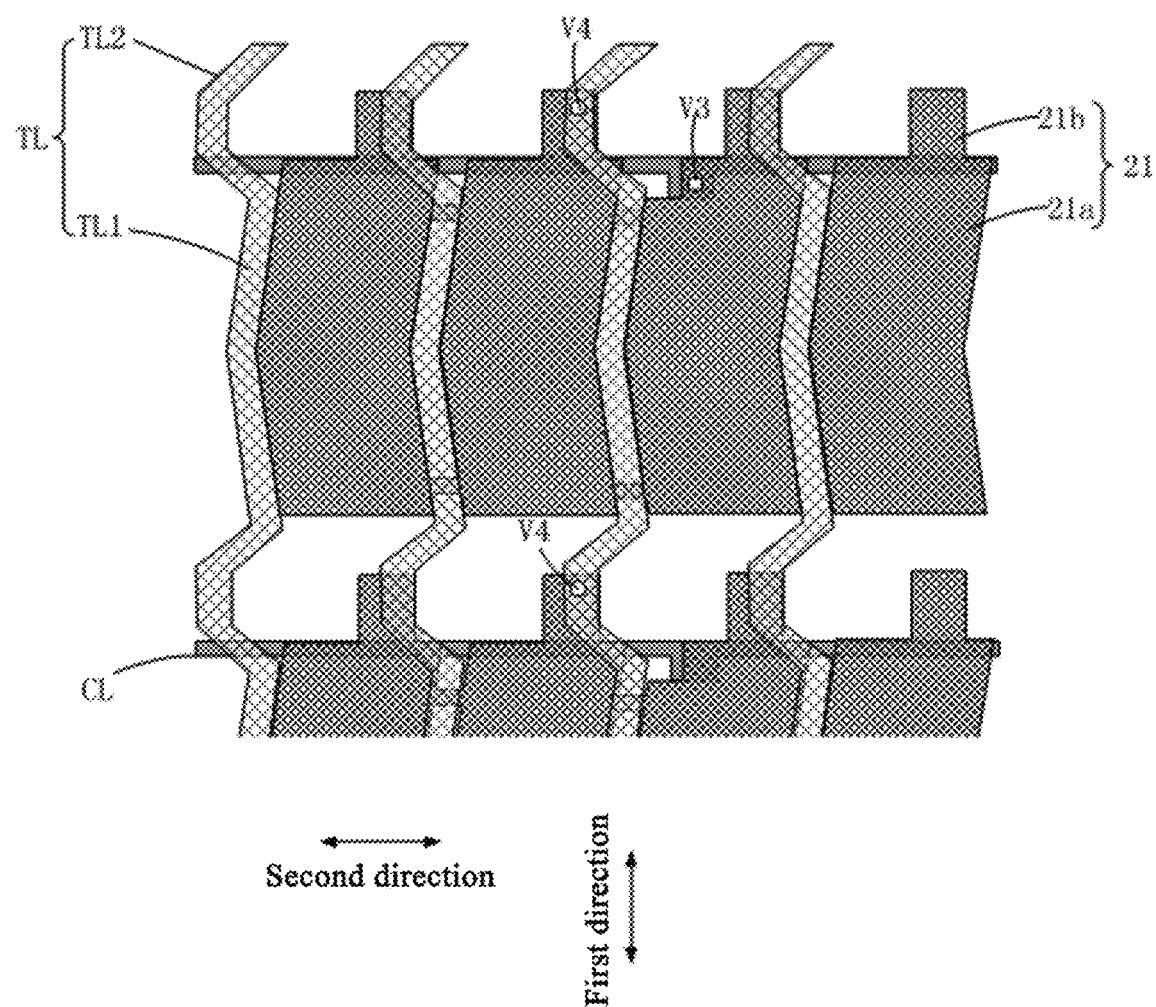
FIG. 7 is a schematic diagram of the touch electrodes, the touch signal lines and the common electrode lines in FIG. 5.
Figure 8:
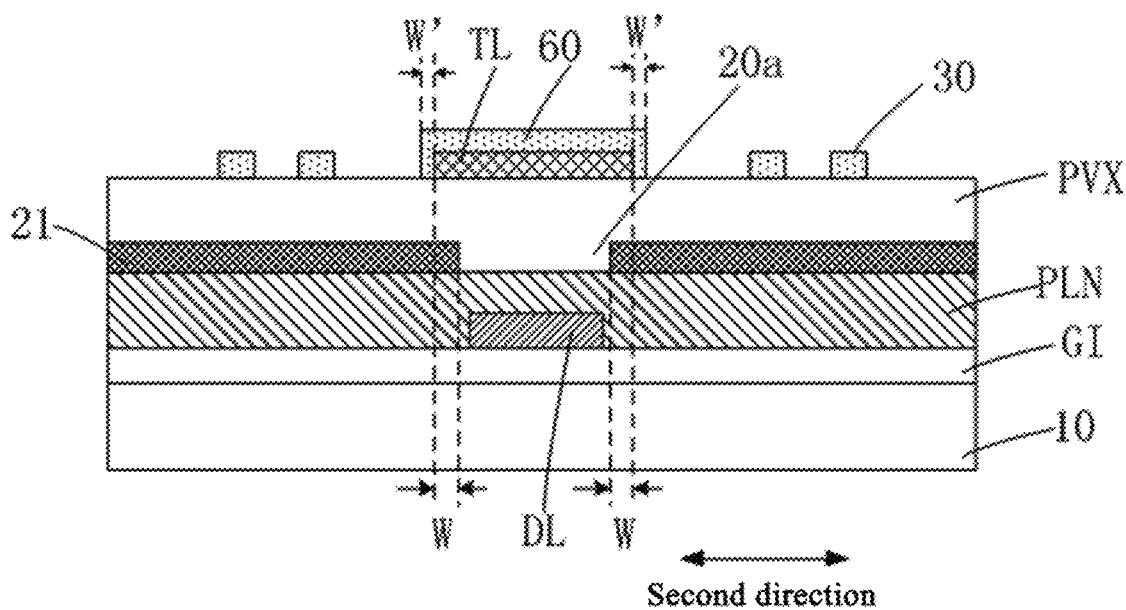
FIG. 8 is a sectional view taken along line B-B' in FIG. 5 according to some embodiments of the present disclosure.

FIG. 4 is a schematic diagram showing area division of a display substrate according to some embodiments of the present disclosure, FIG. 5 is a partial schematic diagram of a display substrate according to some embodiments of the present disclosure, FIG. 6 is a schematic diagram of the touch electrodes in FIG. 5, FIG. 7 is a schematic diagram of the touch electrodes, the touch signal lines and the common electrode lines in FIG. 5, and FIG. 8 is a sectional view taken along line B-B' in FIG. 5 according to some embodiments of the present disclosure. As shown in FIGS. 4 to 8, the display substrate includes a substrate 10, and, on the substrate 10: a plurality of gate lines GL, a plurality of data lines DL, a plurality of touch signal lines TL and a touch layer. The display substrate has a display area AA and a peripheral area WA surrounding the display area AA. At least part of the gate lines GL and at least part of the data lines DL are located in the display area AA. Each data line DL extends in a first direction, each gate line GL extends in a second direction, and the plurality of gate lines GL and the plurality of data lines DL define a plurality of pixel areas PA in the display area AA. The first direction is intersected with the second direction. For example, the first direction is perpendicular to the second direction.

It should be noted that the data line DL extending in the first direction does not necessarily mean that the data line DL is a straight line extending in the first direction. Instead, the data line DL may be bent to some extent, as long as the data line DL has an overall trend of extending in the first direction. Similarly, the gate line GL extending in the second direction means that the gate line GL has an overall trend of extending in the first direction.

The touch layer is located on a side of the layer where the data lines DL are located away from the substrate 10, and includes a plurality of touch electrodes 20 which are multiplexed as common electrodes. Each touch electrode 20 may include a plurality of touch sub-electrodes 21 electrically connected to each other. The plurality of touch sub-electrodes 21 in the touch layer are arranged in an array along the first direction and the second direction. Specifically, the plurality of touch sub-electrodes 21 in the touch layer are arranged in multiple rows in the first direction, and each row includes a plurality of touch sub-electrodes 21 arranged in the second direction. As shown in FIGS. 6 and 8, a first slit 20a is provided between two adjacent touch sub-electrodes 21 along the second direction. In other words, a first slit 20a is provided between two adjacent touch sub-electrodes 21 in the same row, and an orthographic projection of the first slit 20a on the substrate 10 is overlapped with an orthographic projection of the corresponding data line DL on the substrate 10.

It should be understood that the "two adjacent touch sub-electrodes 21 in the same row" may refer to two adjacent touch sub-electrodes 21 in the same touch electrode 20 arranged in the second direction, or two adjacent touch sub-electrodes 21 in two different touch electrodes 20 arranged in the second direction.

The first slit 20a may be a strip structure extending in the first direction. It should be noted that the first slit 20a may be a linear strip structure extending in the first direction, or a bent strip structure, as long as the first slit 20a has an overall trend of extending in the first direction.

The plurality of touch signal lines TL are located on a side of the touch layer away from the substrate 10, the touch signal lines TL are connected to the touch electrodes 20, and an orthographic projection of at least one touch signal line TL on the substrate 10 covers the orthographic projection of the first slit 20a on the substrate 10. The orthographic projection of at least one touch signal line TL on the substrate 10 completely covers the orthographic projection of the first slit 20a on the substrate 10. Specifically, the touch signal line TL has a width in the second direction greater than that of the first slit 20a. For example, the first slit 20a has two first edges arranged in the second direction, and orthographic projections of edges of the touch signal line TL on the substrate 10 may be in contact with orthographic projections of the first edges on the substrate 10, respectively, or the orthographic projection of the touch signal line TL on the substrate 10 exceeds the orthographic projection of the first slit 20a on the substrate 10, and is overlapped with the orthographic projection of the touch sub-electrode 21 on the substrate 10.

In the display stage, the touch sub-electrode 21 and the touch signal line TL may receive a common voltage signal, and in some embodiments of the present disclosure, since the orthographic projection of the touch signal line TL on the substrate 10 covers the orthographic projection of the first slit 20a on the substrate 10, the touch signal line TL can shield an electric field formed between the data line DL and the touch sub-electrode 21, so that the electric field is prevented from affecting the liquid crystal deflection and causing light leakage, and thus the display effect is guaranteed.

In some embodiments, as shown in FIG. 8, an orthographic projection of at least one touch signal line TL on the substrate 10 covers the orthographic projection of the first slit 20a on the substrate 10, and is overlapped with the orthographic projections of the touch sub-electrodes 21 on two sides of the first slit 20a on the substrate 10, thereby further enhancing the shielding effect of the touch signal line TL on the electric field between the data line DL and the touch sub-electrode 21.

It should be noted that the touch sub-electrodes 21 on two sides of the first slit 20a refer to the touch sub-electrodes 21 on two sides of the first slit 20a along the second direction.

In some embodiments, the orthographic projection of each touch signal line TL on the substrate 10 covers the orthographic projection of the first slit 20a on the substrate 10, and is overlapped with the orthographic projections of the touch sub-electrodes 21 on two sides of the first slit 20a on the substrate 10, so as to ensure that no light leakage occurs near the touch signal line TL.

In some embodiments, a data driver chip 71 is disposed on a side of the display area AA, and configured to provide data signals for the data lines DL. The touch signal line TL extends from one end of the display area AA close to the data driver chip 71 to the other end away from the data driver chip 71, so that the orthographic projection of each first slit 20a on the substrate 10 is covered by the orthographic projection of the touch signal line TL on the substrate 10, and light leakage is further avoided.

In some embodiments, the orthographic projection of the touch signal line TL on the substrate 10 is overlapped with the orthographic projections of the touch sub-electrodes 21 on two sides of the first slit 20a on the substrate 10 by a first width W. It should be noted that the overlapping width refers to a width of the overlapping area in the second direction. The first width W may be set according to a first preset width D, which is a parameter related to the manufacturing process. Specifically, $$D=\sqrt{D1^2+D2^2+D3^2}.$$

D1 is a maximum displacement fluctuation value in a manufacturing process of the touch signal line TL. The maximum displacement fluctuation value in the manufacturing process of a device means a distance, caused by the precision of the manufacturing process, between an actual position of a center of the device on the substrate 10 and a target position thereof. D2 is a maximum single-side size fluctuation value in the manufacturing process of the touch signal line TL. Specifically, the touch signal line TL has a target width W1 and an actual width W2, so |W1-W2|/2 is the single-side size fluctuation value and has a maximum value D2. D3 is a maximum size fluctuation value in the manufacturing process of the touch sub-electrode 21, where D3 represents a maximum single-side size fluctuation value of the touch sub-electrode 21. Specifically, the touch sub-electrode 21 has a target width W3 and an actual width W4, so |W3-W4|/2 has a maximum value D2.

In some embodiments, the first width W is 1 to 1.2 times of D. In this case, even if process fluctuations occur during the manufacturing process, it can be still ensured that the orthographic projection of the touch signal line TL on the substrate 10 covers the orthographic projection of the first slit 20a on the substrate 10.

Preferably, the first width is D, so as to ensure that when process fluctuations occur, the orthographic projection of the touch signal line TL on the substrate 10 covers the orthographic projection of the first slit 20a on the substrate 10, and an overlapping area between the touch signal line TL and the touch electrode 20 will not be too large, so as to prevent generation of a large parasitic capacitance which may affect the touch effect.

In an example, D1=1.5 μm, D2=0.6 μm, D3=0.5 μm, and D=1.69 μm. In this case, the first width W may be set in a range of 1.69 μm to 2.0 μm. For example, W is set to 1.69 μm, or 1.7 μm, or 1.8 μm, or 1.9 μm, or 2.0 μm.

In the display panel, the assembling substrate opposite to the display substrate includes a black matrix. An orthographic projection of the black matrix on the substrate 10 covers orthographic projections of the data line DL, the gate line GL, and the touch signal line TL on the substrate 10, and in order to increase an effective light emitting area of the pixel area, the touch signal line TL and the data line DL may be each set to have a smaller width. In an example, the first slit 20a has a width between 3 μm and 7 μm, W is between 1.69 μm and 2.0 μm, and the data line DL has a width between 4 μm and 6 μm, so that the touch signal line TL and the data line DL both have a smaller width, and thus the black matrix has a smaller width, thereby increasing the effective light emitting area of the pixel area. For example, in the structure of FIG. 8, the data line DL has a width of 5

μm, the touch signal line TL has a width of 7 μm, the first slit 20a has a width of 3.6 μm, and W is set to 1.7 μm.

Figure 9:
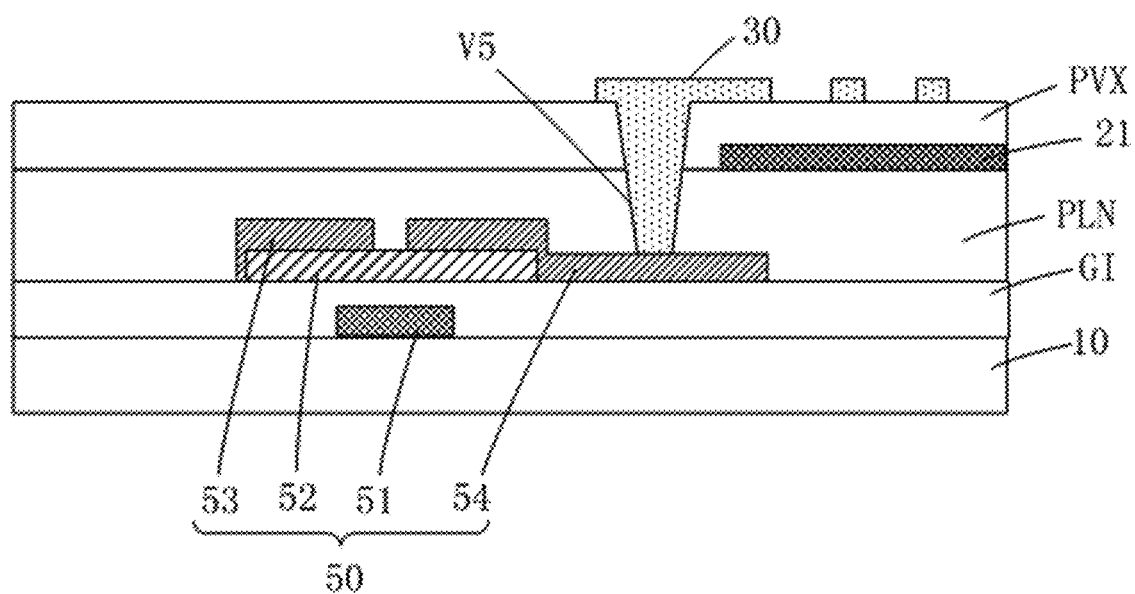
FIG. 9 is a schematic diagram showing connection between a pixel electrode and a thin film transistor in FIG. 5.

As shown in FIGS. 5 and 8, each pixel area PA is provided with a pixel electrode 30 on a side of the touch layer away from the substrate 10 and having a second slit 30a. The second slit 30a may be a polygonal line type. It should be noted that FIG. 8 merely shows the structure of the data line DL and a layer above the data line DL, and for the structure between the data line DL and the substrate 10, reference may be made to FIG. 9. FIG. 9 is a schematic diagram showing connection between a pixel electrode and a thin film transistor in FIG. 5. As shown in FIGS. 5 and 9, each pixel area PA corresponds to a thin film transistor 50 which includes a gate electrode 51, an active layer 52, a source electrode 53, and a drain electrode 54.

The gate electrode 51 of the thin film transistor 50 forms an integral structure with the gate line GL, and a gate insulating layer GI is disposed on a side of the layer where the gate line GL is located away from the substrate 10. The gate electrode 51 and the gate line GL may be made of a material including a metal, a metal alloy, a metal nitride, a conductive metal oxide, a transparent conductive material, or the like. For example, the gate electrode 51 and the gate line GL may include gold (Au), an alloy of gold, silver (Ag), an alloy of silver, aluminum (Al), an alloy of aluminum, aluminum nitride (AlNx), tungsten (W), tungsten nitride (WNx), copper (Cu), an alloy of copper, nickel (Ni), chromium (Cr), chromium nitride (CrNx), molybdenum (Mo), an alloy of molybdenum, titanium (Ti), titanium nitride (TiNx), platinum (Pt), tantalum (Ta), tantalum nitride (TaNx), neodymium (Nd), scandium (Sc), strontium ruthenium oxide (SRO), zinc oxide (ZnOx), tin oxide (SnOx), indium oxide (InOx), gallium oxide (GaOx), indium tin oxide (ITO), indium zinc oxide (IZO), and the like. The gate electrode 51 and the gate line GL may have a single layer or a plurality of layers.

The gate insulating layer GI may include, for example, a silicon compound or a metal oxide. For example, the gate insulating layer GI may include silicon oxynitride (SiON), silicon oxide (SiOx), silicon nitride (SiNx), silicon oxycarbide (SiOxCy), silicon carbonitride (SiCxNy), aluminum oxide (AlOx), aluminum nitride (AlNx), tantalum oxide (TaOx), hafnium oxide (HfOx), zirconium oxide (ZrOx), titanium oxide (TiOx), or the like. The gate insulating layer GI may be formed into a single-layer or multi-layer structure.

The active layer 52 is located on a side of the gate insulating layer GI away from the substrate 10, and may include, for example, an inorganic semiconductor material (e.g., polysilicon, amorphous silicon), an organic semiconductor material, or an oxide semiconductor material. The active layer 52 includes a source contact area, a drain contact area, and a channel area between the two. The channel area is arranged opposite to the gate electrode, and both the source contact area and the drain contact area may include impurities of a higher concentration than those in the channel area. The impurities may include N-type impurities or P-type impurities.

The source electrode 53 and the drain electrode 54 are located on a side of the active layer 52 away from the substrate 10, the source electrode 53 is connected to the source contact area, and the drain electrode 54 is connected to the drain contact area. The source electrode 53 forms an integral structure with the data line DL. The source electrode 53 and the drain electrode 54 are disposed in a same layer. The source electrode 53 and the drain electrode 54 may be made of a material including a metal, an alloy, a metal nitride, a conductive metal oxide, a transparent conductive material, or the like, and each of the source electrode 53 and the drain electrode 54 may be a single-layer or multi-layer structure composed of a metal. For example, the source electrode 53 and the drain electrode 54 each are made of Mo/Al/Mo or Ti/Al/Ti.

As shown in FIGS. 5 and 9, the pixel electrode 30 is connected to the drain electrode 54 of the thin film transistor 50 through a fifth via V5. For example, the pixel electrode 30 includes an electrode main body portion 31 and an electrode connecting part 32 connected to each other. The electrode connecting part 32 and the electrode main body portion 31 may form an integral structure. The electrode main body portion 31 is provided with the second slit 30a. The electrode connecting part 32 is located on a side of the electrode main body 31, and connected to the drain electrode 54 of the thin film transistor 50 through the fifth via V5. The fifth via V5 extends through each layer between the layer where the pixel electrode 30 is located and the drain electrode 54. The pixel electrode 30 and the touch electrode 20 may be each made of a transparent conductive material such as indium tin oxide (ITO).

As shown in FIG. 5, the display substrate further includes a plurality of common electrode lines CL between the touch layer and the substrate 10 and electrically connected to the touch electrodes 20. The common electrode line CL and the gate line GL may be disposed in a same layer, and the touch layer is connected to the common electrode line CL through a third via V3 which extends through the gate insulating layer GI and a planarization layer PLN.

The plurality of pixel areas PA in the display area AA may be formed into a plurality of repetitive units each including a plurality of pixel areas PA, for example, three pixel areas PA (a red pixel area, a green pixel area, and a blue pixel area, respectively). In an example, the orthographic projection of the touch electrode 20 on the substrate 10 is overlapped with the plurality of repetitive units each provided with a third via V3. Therefore, the touch electrode 20 is connected to the common electrode line CL through the plurality of third vias V3, so that the touch electrode 20 receives a more uniform common voltage at different positions thereof. For example, each repetitive unit is provided with one third via V3.

With continued reference to FIGS. 8 and 9, a planarization layer PLN is disposed on a side of the layer where the source electrode 53 and the drain electrode 54 are located away from the substrate 10. The planarization layer PLN may include an organic insulating material, including, for example, a resin-based material such as polyimide, epoxy, acryl, polyester, photoresist, polyacrylate, polyamide, siloxane, or the like. As another example, the organic insulating material includes an elastic material, such asurethane, thermoplastic polyurethane (TPU), or the like.

The touch layer is located on a side of the planarization layer PLN away from the substrate 10. A passivation layer PVX is disposed on a side of the touch layer away from the substrate 10, and the touch signal line TL and the pixel electrode 30 are both located on a side of the passivation layer PVX away from the substrate 10. The passivation layer PVX may include, for example, a silicon compound or a metal oxide. For example, the passivation layer PVX may include silicon oxynitride (SiON), silicon oxide (SiOx), silicon nitride (SiNx), silicon oxycarbide (SiOxCy), silicon carbonitride (SiCxNy), aluminum oxide (AlOx), aluminum nitride (AlNx), tantalum oxide (TaOx), hafnium oxide (HfOx), zirconium oxide (ZrOx), titanium oxide (TiOx), or the like. The passivation layer PVX may be formed into a single-layer or multi-layer structure.

In some embodiments, a protective layer 60, disposed in the same layer as the pixel electrode 30, are further provided on a side of the touch signal line TL away from the substrate 10. The touch signal line TL may be made of a metal material, the protective layer 60 may be made of a transparent conductive material such as indium tin oxide (ITO), and the protective layer 60 may cover the touch signal line TL, so that the touch signal line TL is protected and prevented from being corroded, and an overall resistance of the touch signal line TL and the protective layer 60 is smaller than a resistance of the touch signal line TL itself, thereby facilitating transmission of touch signals. The touch signal line TL has an upper surface away from the substrate 10, a lower surface facing the substrate 10, and a side surface connected between the upper surface and the lower surface. The protective layer 60 covering the touch signal line TL may mean that the protective layer 60 covers the upper surface and the side surface of the touch signal line TL.

In some embodiments, an orthographic projection of the protective layer 60 on the substrate 10 exceeds the orthographic projection of the touch signal line TL on the substrate 10 by a width W' which is greater than or equal to a second preset width D'. D' is a parameter related to the manufacturing process. Specifically, $$D' = \sqrt{D1^2 + D2^2 + D4^2 + D5^2}.$$

As described above, D1 is a maximum displacement fluctuation value in a manufacturing process of the touch signal line TL; and D2 is a maximum single-side size fluctuation value in the manufacturing process of the touch signal line TL. In addition, D4 is a maximum displacement fluctuation value in a manufacturing process of the protective layer 60; and D5 is a maximum single-side size fluctuation value in the manufacturing process of the protective layer 60.

By setting W' to be greater than or equal to the second preset width D', it can be ensured that the orthographic projection of the protective layer 60 on the substrate 10 can cover the orthographic projection of the touch signal line TL on the substrate 10 even if process fluctuations occur, thereby ensuring the protection effect of the protective layer 60 on the touch signal line TL.

In an example, D1=1.5 μm, D2=0.6 μm, D4=1.5 μm, and D5=0.5 μm. In this case, W' may be set between 2.26 μm and 2.8 μm. For example, W' is set to 2.26 μm, or 2.3 μm, or 2.45 μm, or 2.5 μm.

In some embodiments, the touch signal line TL is connected to the touch electrode 20 through a fourth via V4 extending through the passivation layer PVX. As shown in FIGS. 5 to 7, each touch signal line TL includes: a plurality of first line segments TL1 arranged in a first direction, and a second line segment TL2 connected between two adjacent first line segments TL1. An orthographic projection of each first line segment TL1 on the substrate 10 is overlapped with an orthographic projection of the first slit 20a on the substrate 10, and is overlapped with an orthographic projection of the corresponding data line DL on the substrate 10. The second line segment TL2 is bent toward a side of the data line DL in a width direction thereof, and an orthographic projection of at least part of the second line segment TL2 on the substrate 10 is overlapped with neither the orthographic projection of the data line DL on the substrate 10, nor the orthographic projection of the first slit 20a on the substrate 10. An orthographic projection of the second line segment TL2 on the substrate 10 is overlapped with an orthographic projection of the corresponding gate line GL on the substrate 10. Each touch electrode 20 is connected to the second line segment TL2 of the corresponding touch signal line TL.

In some embodiments, each touch electrode 20 is connected to a plurality of second line segments TL2 of the corresponding touch signal line TL. For example, each touch electrode 20 includes multiple rows of touch sub-electrodes 21, and as shown in FIG. 6, within a same touch electrode 20, two adjacent touch sub-electrodes 21 in a same row are connected through a connecting part 20b which forms an integral structure with the touch sub-electrodes 21. For example, two adjacent touch sub-electrodes 21 are connected through two connecting parts 20b, and a gap between the two connecting parts 20b and between the two touch sub-electrodes 21 may serve as the first slit 20a. Within a same touch electrode 20, one of the touch sub-electrodes 21 in each row is connected to the second line segment TL2 of the touch signal line TL.

In some embodiments, referring to FIGS. 5 and 7, each touch sub-electrode 21 includes a first portion 21a and a second portion 21b connected into an integral structure. An orthographic projection of the first portion 21a on the substrate 10 is overlapped with an orthographic projection of the pixel electrode 30 on the substrate 10. The second portion 21b is located on a side of the first portion 21a and connected to the touch signal line TL through a fourth via V4. The fourth via V4 corresponding to the touch sub-electrode 21 and the first portion 21a of the touch sub-electrode 21 may be located on two opposite sides of the gate line GL, respectively.

Figure 10:
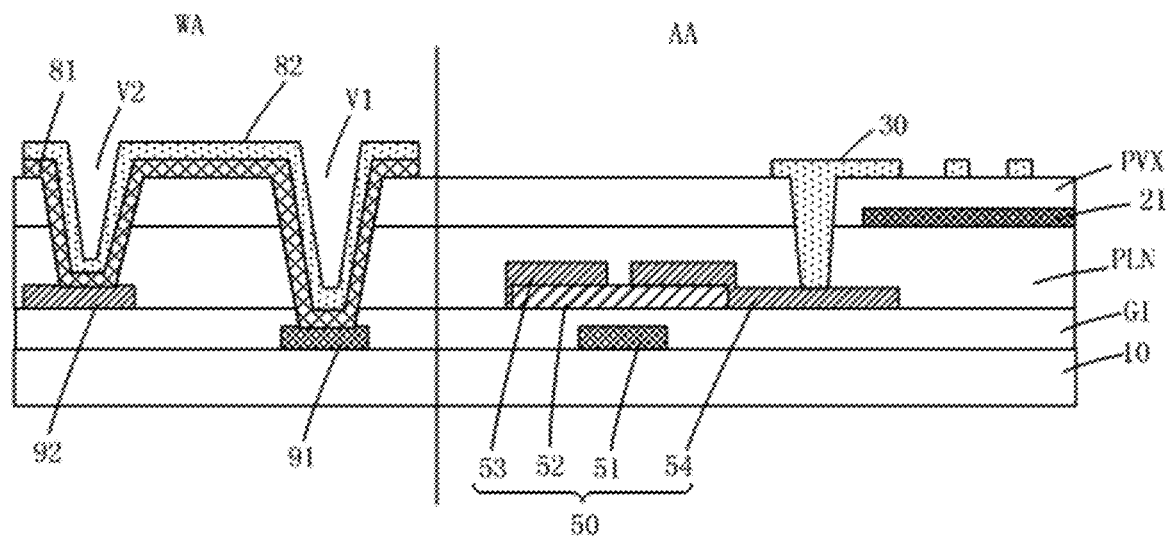
FIG. 10 is a schematic diagram of partial structures in a display area and a peripheral area of a display substrate according to some embodiments of the present disclosure.
Figure 11:
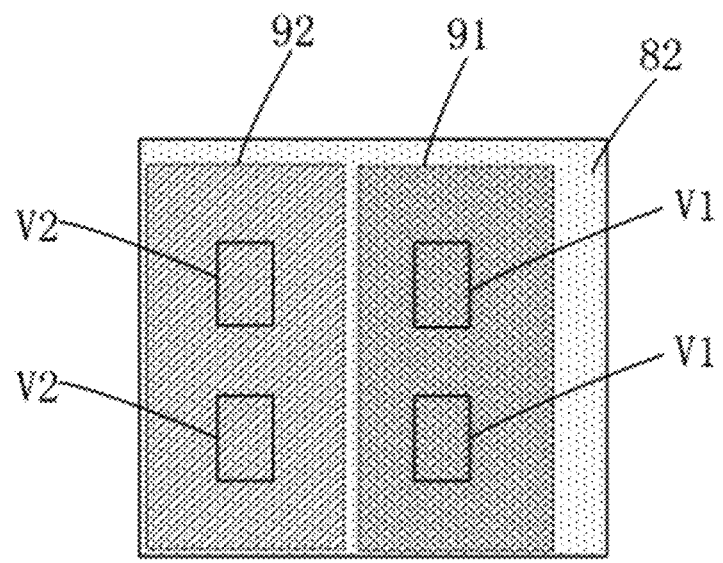
FIG. 11 is a plan view of a first signal transmission electrode connected to a second signal transmission electrode according to some embodiments of the present disclosure.

FIG. 10 is a schematic diagram of partial structures in a display area and a peripheral area of a display substrate according to some embodiments of the present disclosure, and FIG. 11 is a plan view of a first signal transmission electrode connected to a second signal transmission electrode according to some embodiments of the present disclosure. As shown in FIG. 10, the display substrate further includes, in the peripheral area WA: a first signal transmission electrode 91, a second signal transmission electrode 92, and a first connecting electrode 81 and a second connecting electrode 82 arranged in a stack and in contact with each other. The first signal transmission electrode 91 is disposed in the same layer as the gate line GL, and the second signal transmission electrode 92 is disposed in the same layer as the data line DL. The first connecting electrode 81 is disposed in the same layer as the touch signal line TL, and as shown in FIGS. 10 and 11, the first connecting electrode 81 is connected to the first signal transmission electrode 91 through a first via V1, and connected to the second signal transmission electrode 92 through a second via V2. One or more first vias V1 and one or more second vias V2 may be provided. The second connecting electrode 82 is located on a side of the first connecting electrode 81 away from the substrate 10, and the second connecting electrode 82 is disposed in the same layer as the pixel electrode 30.

In some embodiments, materials of the first signal transmission electrode 91, the second signal transmission electrode 92 and the touch signal line TL include a same metal component. In this case, by disposing the first connecting electrode 81 in the same layer as the touch signal line TL, the first signal transmission electrode 91 and the second signal transmission electrode 92 can be prevented from being corroded during etching of the touch signal line TL, and no additional process step will not be increased. The specific reasons are recited below: taking the case where the touch signal line TL and the second signal transmission electrode each include a Mo/Al/Mo stack, and the first signal transmission electrode includes a MoNb/Cu stack (the three contain a same metal component Mo) as an example, if the first connecting electrode 81 is not provided, and the first signal transmission electrode 91 is connected to the second signal transmission electrode 92 only through the second connecting electrode 82 in the same layer as the pixel electrode 30, then after the first via V1 and the second via V2 are formed, an etching solution may enter the first via V1 and the second via V2 during patterning of the touch signal line TL, thereby corroding the first signal transmission electrode 91 and the second signal transmission electrode 92. In contrast, if the first connecting electrode 81 is provided, the metal material above the first via V1 and the second via V2 does not need to be etched during patterning of the touch signal line TL, so that the case where the etching solution enters the first via V1 and the second via V2 and corrodes the first signal transmission electrode 91 and the second signal transmission electrode 92 is avoided.

In some embodiments, the first signal transmission electrode 91 and the second signal transmission electrode 92 may be configured to realize connection between a gate driver circuit and the gate line GL. As shown in FIG. 4, a gate driver circuit 72 is disposed in the peripheral area WA. The gate driver circuit 72 includes a plurality of shift register units, each of which corresponds to one of the gate lines GL and is configured to provide a scanning signal for the corresponding gate line GL. The peripheral area WA is provided with gate line lead portions GL1 in one-to-one correspondence with the gate lines GL. The gate line lead portions GL1 each form an integral structure with the gate line GL, and are each connected to one of signal output parts of the shift register units. The first signal transmission electrode 91 may serve as the gate line lead portion GL1, and the second signal transmission electrode 92 may serve as the signal output part of the shift register unit.

In other embodiments, the first signal transmission electrode 91 and the second signal transmission electrode 92 may be further configured to realize electrical connection between the data driver chip 71 and the data line DL. As shown in FIG. 4, the peripheral area WA includes a transfer area DA on a side of the display area AA. The transfer area is provided with a plurality of data line lead portions DL1 in one-to-one correspondence with the data lines DL. For example, the data line lead portions DL1 each form an integral structure with the data line DL. Fanout lines 202 are connected to the data line lead portions DL1 in a one-to-one correspondence manner, and configured to transmit data signals from the data driver chip 71 to the corresponding data lines DL. The first signal transmission electrode 91 may serve as the fanout line 202, and the second signal transmission electrode 92 may serve as the data line lead portion DL1.

Alternatively, some first signal transmission electrodes 91 and some second signal transmission electrodes 92 are configured to realize electrical connection between the data driver chip 71 and the data lines DL, while other first signal transmission electrodes 91 and other second signal transmission electrodes 92 are configured to realize connection between the gate driver circuit 72 and the gate lines GL.

Apparently, the first signal transmission electrode 91 and the second signal transmission electrode 92 may further serve as other signal transmission structures, which are not listed here.

Figure 12:
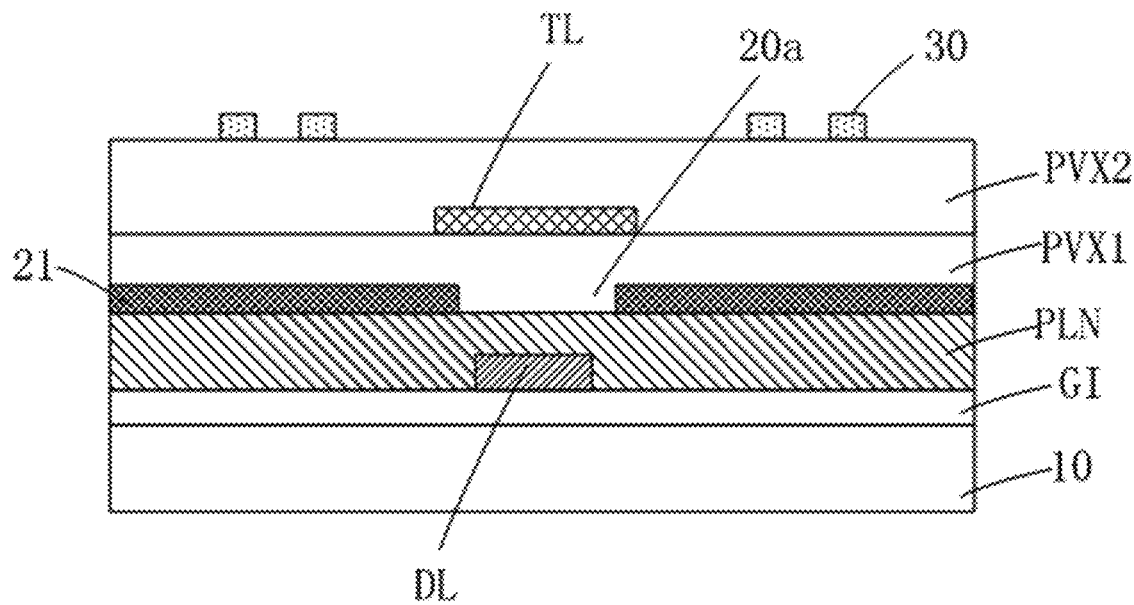
FIG. 12 is a sectional view taken along line B-B' in FIG. 5 according to some other embodiments of the present disclosure.

FIG. 12 is a sectional view taken along line B-B' in FIG. 5 according to some other embodiments of the present disclosure. FIG. 12 is similar to FIG. 8, except that in FIG. 12, a first passivation layer PVX1 and a second passivation layer PVX2 are provided on a side of the touch layer away from the substrate 10, the second passivation layer PVX2 is located on a side of the first passivation layer PVX1 away from the substrate 10, the touch signal line TL is located between the first passivation layer PVX1 and the second passivation layer PVX2, and the pixel electrode 30 is located on a side of the second passivation layer PVX2 away from the substrate 10. In this case, the fourth via V4 connecting the touch signal line TL and the touch electrode 20 extends through the first passivation layer PVX1, and the third via V3 connecting the touch electrode 20 and the common electrode line CL extends through the first passivation layer PVX1, the second passivation layer PVX2, the planarization layer PLN, and the gate insulating layer GI.

The first passivation layer PVX1 and the second passivation layer PVX2 may be made of a material selected from the materials for the passivation layer PVX listed above.

Comparing FIG. 12 with FIG. 8, the display substrate shown in FIG. 12 is provided with two passivation layers, while the display substrate shown in FIG. 8 is provided with one passivation layer PVX. As a result, with the display substrate shown in FIG. 8, less film structures are used, and the manufacturing process can be simplified.

In FIG. 12, the orthographic projection of the touch signal line TL on the substrate 10 may be also overlapped with the orthographic projections of the touch sub-electrodes 21 on two sides of the first slit 20a on the substrate 10 with an overlapping width between D and 1.2D. For example, the first width is between 1.69 µm and 2.0 µm. In an example, the first slit 20a has a width of 6.6 µm, the touch signal line TL has a width of 10.0 µm, the first width is 1.7 µm, and the data line DL has a width of 4.2 µm.

Figure 13:
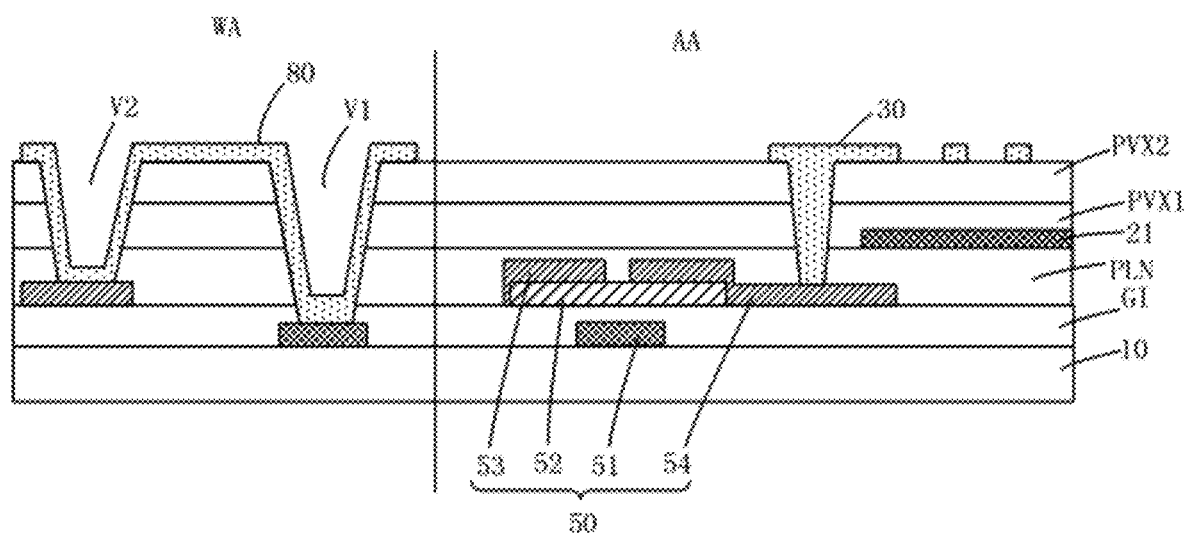
FIG. 13 is a schematic diagram of partial structures in the peripheral area and the display area according to some other embodiments of the present disclosure.

FIG. 13 is a schematic diagram of partial structures in the peripheral area and the display area according to some other embodiments of the present disclosure. As shown in FIG. 13, where the display substrate includes the first passivation layer PVX1 and the second passivation layer PVX2, the touch signal line TL is located between the first passivation layer PVX1 and the second passivation layer PVX2, and the pixel electrode 30 is located on the side of the second passivation layer PVX2 away from the substrate 10, the first signal transmission electrode 91 and the second signal transmission electrode 92 in the peripheral area WA may be connected through a connecting electrode 80. The connecting electrode 80 is disposed in the same layer as the pixel electrode 30. The connecting electrode 80 is connected to the first signal transmission electrode 91 through a first via V1, and connected to the second signal transmission electrode 92 through a second via V2. For the display substrate shown in FIG. 13, in the manufacturing process, the first via V1 and the second via V2 may be formed after the second passivation layer PVX2 is formed, and patterning of the touch signal line TL is completed after the first passivation layer PVX1 is formed, so that the etching solution will not contact the first signal transmission electrode 91 and the second signal transmission electrode 92 during the patterning of the touch signal line TL.

Figure 14:
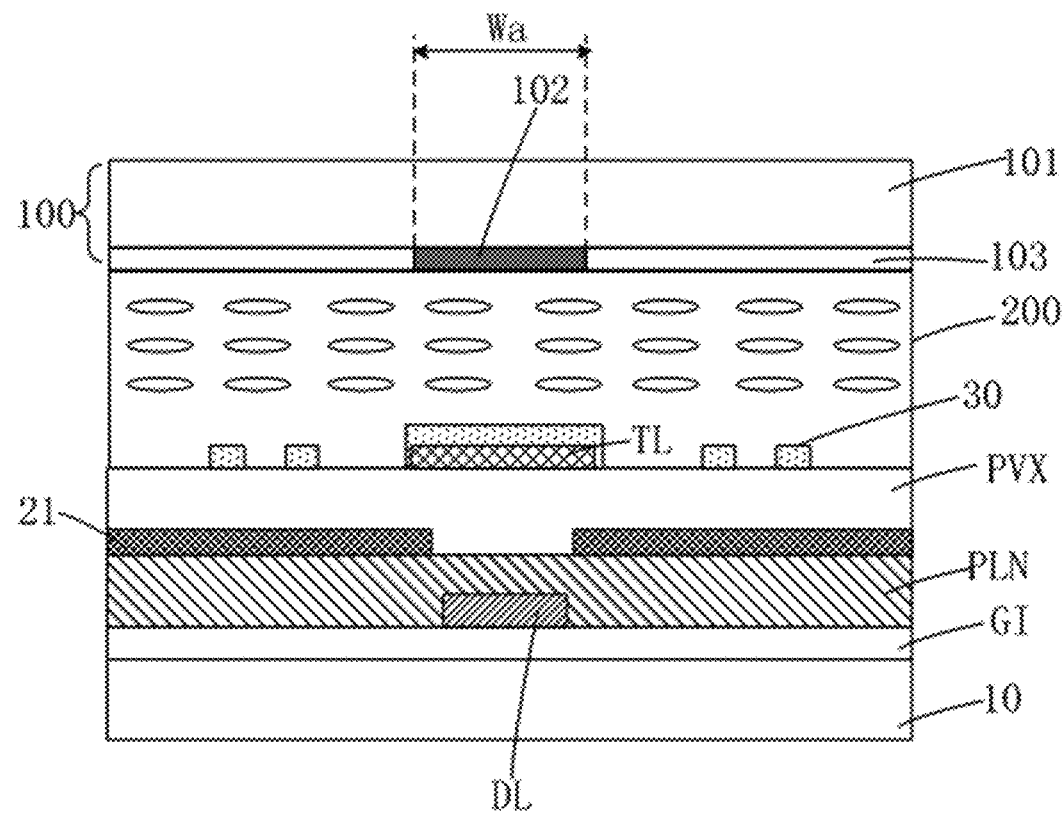
FIG. 14 is a schematic diagram of a display panel according to some embodiments of the present disclosure.

An embodiment of the present disclosure further provides a display panel. FIG. 14 is a schematic diagram of a display panel according to some embodiments of the present disclosure. As shown in FIG. 14, the display panel includes the display substrate according to any of the above embodiments, and an assembling substrate 100. The display substrate and the assembling substrate 100 are disposed opposite to each other. In addition, the display panel may further include a liquid crystal layer 200 between the display substrate and the assembling substrate 100. Specifically, the assembling substrate 100 may be a color filter substrate, and includes a color filter layer and a black matrix 102 on a base 101. The color filter layer includes a plurality of color filter parts 103, such as a red filter part, a green filter part, and a blue filter part, and each pixel area corresponds to one of the color filter parts 103. The red pixel area mentioned above refers to a pixel area corresponding to the red filter part, the green pixel area refers to a pixel area corresponding to the green filter part, and the blue pixel area refers to a pixel area corresponding to the blue filter part. An orthographic projection of the black matrix 102 on the substrate 10 covers orthographic projections of the gate line, the data line DL, the touch signal line TL and the thin film transistor on the substrate 10.

In an example, the first slit 20a has a width between 3 μm and 7 μm, the orthographic projection of the touch signal line TL on the substrate 10 and the orthographic projection of the touch sub-electrode 21 on the substrate 10 have an overlapping width between 1.69 μm and 2.0 μm, and the data line DL has a width between 4 μm and 6 μm. In the embodiment of the present disclosure, since the touch signal line TL can shield an electric field formed between the data line DL and the touch sub-electrode 21, to prevent the electric field from affecting the liquid crystal deflection and causing light leakage, the black matrix 102 does not need to have a relatively large width. For example, the black matrix 102 may have a smaller width than the touch signal line TL.

An embodiment of the present disclosure further provides a display apparatus including the display panel according to any one of the above embodiments. The display apparatus may be: electronic paper, a mobile phone, a tablet, a television, a monitor, a laptop, a digital album, a navigator, or any other product or component having a display function.

Other implementations of the present disclosure will be apparent to those skilled in the art from consideration of the description and practice of the present disclosure disclosed herein. The present disclosure is intended to cover any variations, uses, or adaptations of the present disclosure which follow general principles of the present disclosure and include common knowledge or conventional technical means in the art that are not disclosed herein. The description and the embodiments are intended to be considered as exemplary only, with a true scope and spirit of the present disclosure being indicated by the following claims.

It will be appreciated that the present disclosure is not limited to the precise structures as described above and shown in the drawings, and that various modifications and changes may be made without departing from the scope of the present disclosure. The scope of the present disclosure is defined only by the appended claims.

What is claimed is:

1. A display substrate, comprising:
a substrate;
a plurality of data lines on the substrate and each extending in a first direction;
a touch layer on a side of a layer where the data lines are located away from the substrate, wherein the touch layer comprises a plurality of touch electrodes which are configured to be multiplexed as common electrodes, and each of the plurality of touch electrodes comprises a plurality of touch sub-electrodes electrically connected to each other; wherein the touch sub-electrodes are arranged in an array along the first direction and a second direction, a first slit is provided between any two adjacent ones of the touch sub-electrodes along the second direction, and an orthographic projection of the first slit on the substrate is overlapped with an orthographic projection of a corresponding one of the plurality of data lines on the substrate; and the first direction is intersected with the second direction; and
a plurality of touch signal lines on a side of the touch layer away from the substrate and connected to the plurality of touch electrodes, wherein an orthographic projection of at least one of the plurality of touch signal lines on the substrate covers the orthographic projection of the first slit on the substrate.

2. The display substrate according to claim 1, wherein the orthographic projection of the at least one touch signal line on the substrate is overlapped with orthographic projections of the touch sub-electrodes on two sides of the first slit.

3. The display substrate according to claim 2, wherein the orthographic projection of the at least one touch signal line on the substrate is overlapped with the orthographic projections of the touch sub-electrodes on two sides of the first slit on the substrate by a first width in the second direction, wherein the first width is 1 to 1.2 times of a preset width D, $$D=\sqrt{D1^2+D2^2+D3^2}$$

where D1 is a maximum displacement fluctuation value in a manufacturing process of the plurality of touch signal lines; D2 is a maximum single-side size fluctuation value in the manufacturing process of the plurality of touch signal lines; and D3 is a maximum single-side size fluctuation value in the manufacturing process of the touch sub-electrodes.

4. The display substrate according to claim 3, wherein the first width is equal to D.

5. The display substrate according to claim 3, wherein the first width is between 1.69 μm and 2.0 μm.

6. The display substrate according to claim 2, wherein an orthographic projection of each of the plurality of touch signal lines on the substrate covers the orthographic projection of the first slit on the substrate, and is overlapped with the orthographic projections of the touch sub-electrodes on two sides of the first slit on the substrate.

7. The display substrate according to claim 1, wherein the display substrate has a display area in which the touch layer and at least part of the plurality of data lines are located, the display area is further provided with a plurality of gate lines which, with the plurality of data lines, divide the display area into a plurality of pixel areas, wherein each of the plurality of pixel areas is provided with a pixel electrode on a side of the touch layer away from the substrate and having a second slit.

8. The display substrate according to claim 7, wherein a first passivation layer is disposed between the touch layer and the plurality of touch signal lines, a second passivation layer is disposed on a side of a layer where the plurality of touch signal lines are located away from the substrate, and the pixel electrode is disposed on a side of the second passivation layer away from the substrate.

9. The display substrate according to claim 8, wherein the display substrate further has a peripheral area surrounding the display area, and the display substrate further comprises, in the peripheral area:
a first signal transmission electrode in a same layer as the plurality of gate lines;
a second signal transmission electrode in a same layer as the plurality of data lines; and
a connecting electrode in a same layer as the pixel electrode, wherein the connecting electrode is connected to the first signal transmission electrode through a first via, and connected to the second signal transmission electrode through a second via.

10. The display substrate according to claim 7, wherein a passivation layer is disposed on a side of the touch layer away from the substrate, and the plurality of touch signal lines and the pixel electrode are both located on a side of the passivation layer away from the substrate; and a protective layer is further disposed on a side of the plurality of touch signal lines away from the substrate, wherein the protective layer covers the plurality of touch signal lines and is disposed in a same layer as the pixel electrode.

11. The display substrate according to claim 10, wherein an orthographic projection of the protective layer on the substrate exceeds the orthographic projection of the at least one touch signal line on the substrate by a width being 1 to 1.2 times of a second preset width D', $$D' = \sqrt{D1^2 + D2^2 + D4^2 + D5^2}$$

where D1 is a maximum displacement fluctuation value in a manufacturing process of the plurality of touch signal lines; D2 is a maximum single-side size fluctuation value in the manufacturing process of the plurality of touch signal line; D4 is a maximum displacement fluctuation value in a manufacturing process of the protective layer; and D5 is a maximum single-side size fluctuation value in the manufacturing process of the protective layer.

12. The display substrate according to claim 7, wherein the display substrate further has a peripheral area surrounding the display area, and the display substrate further comprises, in the peripheral area:
a first signal transmission electrode in a same layer as the plurality of gate lines;
a second signal transmission electrode in a same layer as the plurality of data lines; and
a first connecting electrode and a second connecting electrode arranged in a stack and connected to each other, wherein the first connecting electrode is disposed in a same layer as the plurality of touch signal lines, the first connecting electrode is connected to the first signal transmission electrode through a first via, and connected to the second signal transmission electrode through a second via; and the second connecting is disposed on a side of the first connecting away from the substrate, and is disposed in a same layer as the pixel electrode.

13. The display substrate according to claim 12, wherein orthographic projections of the first connecting and the second connecting electrode on the substrate are coincided.

14. The display substrate according to claim 1, wherein the display substrate further comprises a plurality of common electrode lines between the touch layer and the substrate and electrically connected to the plurality of touch electrodes.

15. The display substrate according to claim 1, wherein each of the plurality of touch signal lines comprises a plurality of first line segments arranged in a first direction and a second line segment connected between any two adjacent ones of the plurality of first line segments, wherein an orthographic projection of each of the plurality of first line segments on the substrate is overlapped with the orthographic projection of the first slit on the substrate, and an orthographic projection of at least part of the second line segment on the substrate is not overlapped with the orthographic projection of the first slit on the substrate; and
each of the plurality of touch electrodes is connected to the second line segment of a corresponding one of the plurality of touch signal lines.

16. The display substrate according to claim 15, wherein each touch electrode is connected to a plurality of second line segments of the corresponding touch signal line.

17. The display substrate according to claim 15, wherein within a same one of the plurality of touch electrodes, one of the touch sub-electrodes in each row is connected to the corresponding touch signal line; and any two adjacent ones of the touch sub-electrodes in a same row are connected through a connecting part which forms an integral structure with the touch sub-electrodes.

18. The display substrate according to claim 15, wherein the display substrate further comprises a plurality of gate lines, and an orthographic projection of the second line segment on the substrate is overlapped with an orthographic projection of a corresponding one of the plurality of gate lines on the substrate.

19. A display panel, comprising the display substrate according to claim 1 and a color filter substrate arranged opposite to each other.

20. A display apparatus, comprising the display panel according to claim 19.

* * * * *